United States Patent
Cheng et al.

(10) Patent No.: US 9,459,140 B2
(45) Date of Patent: Oct. 4, 2016

(54) OPTICAL DETECTING DEVICE AND RELATED METHOD OF ADJUSTING SYNCHRONIZATION

(71) Applicant: PixArt Imaging Inc., Hsin-Chu (TW)

(72) Inventors: Han-Ping Cheng, Hsin-Chu (TW); Chia-Cheun Liang, Hsin-Chu (TW); Ming-Tsan Kao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 424 days.

(21) Appl. No.: 14/195,862

(22) Filed: Mar. 4, 2014

(65) Prior Publication Data
US 2014/0350880 A1    Nov. 27, 2014

(30) Foreign Application Priority Data
May 21, 2013 (TW) .............................. 102117923 A

(51) Int. Cl.
*G01J 1/10* (2006.01)
*H04N 1/00* (2006.01)
*G01J 1/44* (2006.01)
*G01J 1/42* (2006.01)

(52) U.S. Cl.
CPC ................ *G01J 1/10* (2013.01); *G01J 1/4228* (2013.01); *H04N 1/00* (2013.01); *G01J 2001/4242* (2013.01); *G01J 2001/444* (2013.01)

(58) Field of Classification Search
CPC combination set(s) only.
See application file for complete search history.

(56) References Cited

U.S. PATENT DOCUMENTS

| | | | |
|---|---|---|---|
| 7,187,405 B2 * | 3/2007 | Poplin et al. | 348/226.1 |
| 7,248,289 B2 | 7/2007 | Katoh | |
| 7,362,419 B2 * | 4/2008 | Kurihara et al. | 356/4.07 |
| 7,633,533 B2 * | 12/2009 | Cho et al. | 348/226.1 |
| 9,049,333 B2 * | 6/2015 | Kao et al. | |
| 2008/0178149 A1 * | 7/2008 | Peterson et al. | 717/110 |
| 2011/0169727 A1 * | 7/2011 | Akitt | 345/156 |
| 2013/0120252 A1 * | 5/2013 | Lam et al. | 345/157 |

FOREIGN PATENT DOCUMENTS

| | | |
|---|---|---|
| CN | 100369467 C | 2/2008 |
| CN | 100562072 C | 11/2009 |
| TW | I280042 | 4/2007 |
| TW | I310925 | 6/2009 |
| TW | I311883 | 7/2009 |
| TW | 201207673 | 2/2012 |

* cited by examiner

*Primary Examiner* — Huan Tran
(74) *Attorney, Agent, or Firm* — Winston Hsu; Scott Margo

(57) ABSTRACT

A method of an optical detecting device for synchronizing an exposure timing sequence of an image detector with a light emitting timing sequence of a reference light source is disclosed. The method includes capturing a continued image set according to a predetermined period, analyzing intensity variation of the continued image set, and adjusting the exposure timing sequence of an image detector according to the intensity variation, so as to synchronize the exposure timing sequence of the image detector with the light emitting timing sequence of the reference light source.

30 Claims, 3 Drawing Sheets

OPTICAL DETECTING DEVICE AND RELATED METHOD OF ADJUSTING SYNCHRONIZATION

BACKGROUND OF THE INVENTION

1. Field of the Invention

The present invention relates to an optical detecting device, and more particularly, to a low-cost optical detecting device and a related method of adjusting synchronization.

2. Description of the Prior Art

For eliminating effect of background noise, a conventional optical detecting device utilizes a reference point with specific flickering frequency to filter the background noise. For capturing the reference point with the specific flickering frequency by the image detector, two conventional detection methods, such as synchronous flickering detection and asynchronous flickering detection, can be applied to the image detector according to comparison between an exposure timing sequence of the image detector and a light emitting timing sequence of the reference light source. The conventional synchronous flickering detection method utilizes the optical detecting device to output a signal, and the signal is received by a receiver of the reference point. The light emitting timing sequence of the reference point is adjusted according to the signal receiving time, so as to synchronize with the exposure timing sequence of the image detector. However, the reference point includes the extra signal receiver, and has drawbacks of expensive cost.

SUMMARY OF THE INVENTION

The present invention provides a low-cost optical detecting device and a related method of adjusting synchronization for solving above drawbacks.

According to the claimed invention, a method of an optical detecting device for synchronizing an exposure timing sequence of an image detector with a light emitting timing sequence of a reference light source is disclosed. The method includes capturing a continued image set according to a predetermined period, analyzing intensity variation of the continued image set, and adjusting the exposure timing sequence of the image detector according to the intensity variation so as to synchronize the exposure timing sequence of the image detector with the light emitting timing sequence of the reference light source.

According to the claimed invention, an optical detecting device for reading a reference light source to filter noise is disclosed. The optical detecting device includes an image detector and a control unit. The image detector captures a continued image set according to a predetermined period. The control unit is electrically connected to the image detector. The control unit analyzes intensity variation of the continued image set, and adjusts an exposure timing sequence of the image detector according to the intensity variation, so as to synchronize the exposure timing sequence of the image detector with a light emitting timing sequence of the reference light source.

According to the claimed invention, an optical detecting device for reading a reference light source to filter noise is disclosed. The optical detecting device includes an image detector and a control unit. The image detector has a first operation mode and a second operation mode. An exposure timing sequence of the first operation mode is greater than an exposure timing sequence of the second operation mode. The control unit is electrically connected to the image detector. The control unit switches the image detector into the first operation mode to capture a continued image set according to a predetermine period, analyzes intensity variation of the continued image set, and adjusts the exposure timing sequence of the image detector according to the intensity variation, so as to synchronize the exposure timing sequence of the image detector with a light emitting timing sequence of the reference light source. The control unit switches the image detector into the second operation mode when the exposure timing sequence of the image detector and the light emitting timing sequence of the reference light source are in synchronization.

The present invention does not dispose the extra signal receiver on the reference light source. The control unit of the optical detecting device can directly adjust the exposure timing sequence of the image detector according to the flickering state of the reference light source, so as to synchronize timing sequence of the image detector and the reference light source, for decreasing element amounts and manufacturing cost and enhancing market competition of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
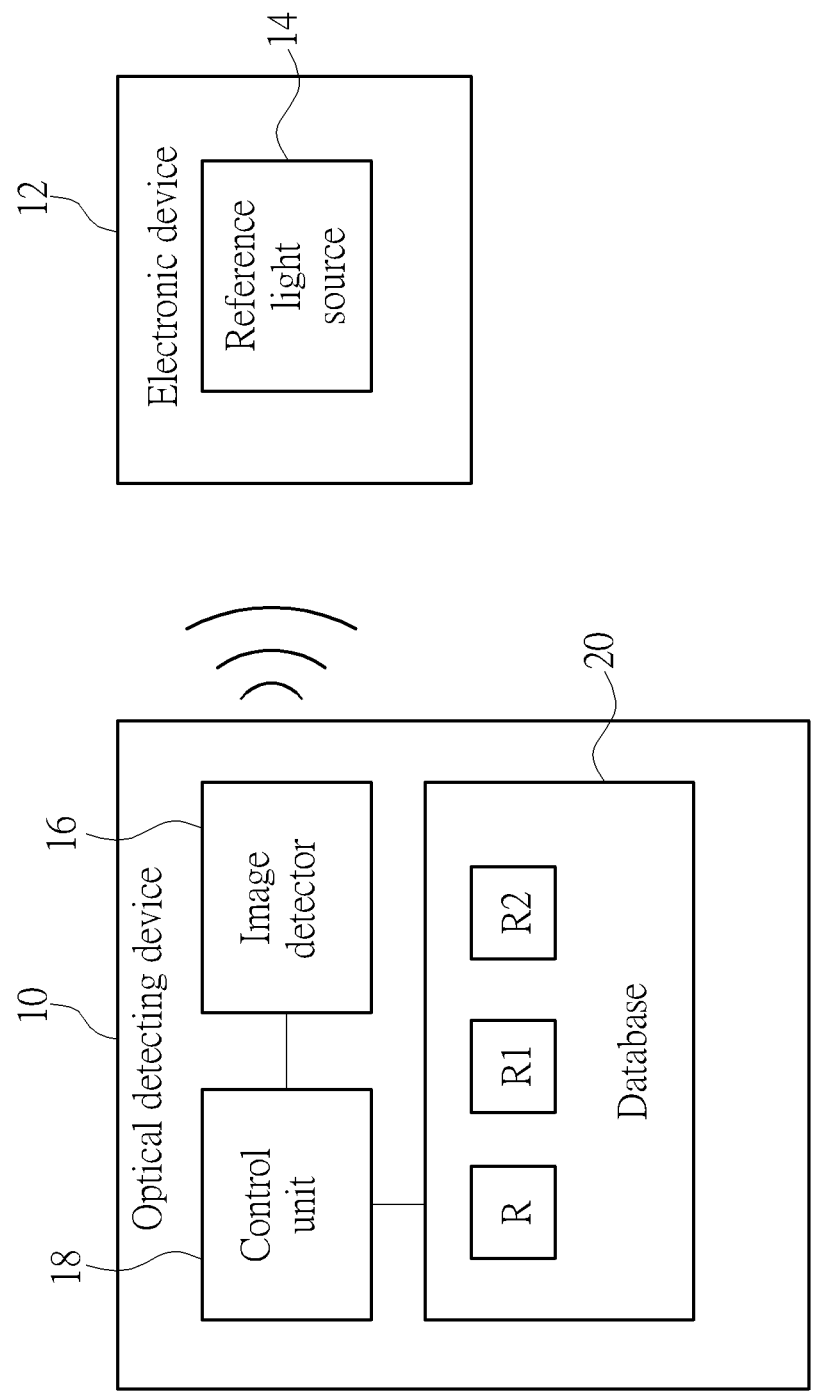
FIG. 1 is a functional block diagram of an optical detecting device according to an embodiment of the present invention.

Please refer to FIG. 1. FIG. 1 is a functional block diagram of an optical detecting device 10 according to an embodiment of the present invention. The optical detecting device 10 can control an electronic device 12 via an optical signal. For eliminating effect of background noise, the electronic device 12 includes a reference light source 14, which helps the optical detecting device 10 to filter the background noise. The optical detecting device 10 includes an image detector 16, a control unit 18 and a database 20. The control unit 18 is electrically connected to the image detector 16 and the database 20.

The optical detecting device 10 of the present invention can utilize image intensity variation of the reference light source 14 detected by the image detector 16 to obtain a duty cycle of the reference light source 14, so as to determine whether exposure timing sequence of the image detector 16 and light emitting timing sequence of the reference light source 14 are in synchronization. Then, a reference value is read to compare with the image intensity variation, so as to find out phase difference between the exposure timing sequence of the image detector 16 and the light emitting timing sequence of the reference light source 14 for synchronization adjustment.

The image detector 16 can capture a continued image set according to a predetermined period. The continue image set includes information of the intensity variation of the reference light source 14. The control unit 18 can compare one reference value R to the intensity variation of the continued image set, and shift the exposure timing sequence of the image detector 16 according to a comparison for synchronizing the exposure timing sequence of the image detector 16 with the light emitting timing sequence of the reference light source 14. The reference value R can be stored inside the database 20, a register or any other storage components.

Each image of the continue image set includes several intensity parameters. For convenient calculation, the each image is processed in the present invention preferably to obtain one or more represent intensity of the image. The plurality of represent intensity, which is simplified from the continued image set, can be compared with the reference value R, so as to determine whether the exposure timing sequence and the light emitting timing sequence are in synchronization according to scale or arrangement of the plurality of represent intensity.

Method of processing the image includes following illustration. The control unit 18 can set partial area or whole area on pixel array of the image detector 16, such as the upper pixel rows, and further can amount intensity of the pixels of the partial area to obtain the represent intensity of the image. Before the synchronization adjustment, the exposure timing sequence of the image detector 16 may be synchronous or asynchronous with the light emitting timing sequence of the reference light source 14, so that the plurality of represent intensity of the continued image set can include several intensity variation or several intensity arranged variation. The control unit 18 further shifts the exposure timing sequence of the image detector 16 according to the intensity of the continued image set, so as to synchronize the exposure timing sequence with the light emitting timing sequence of the reference light source 14.

Figure 2:
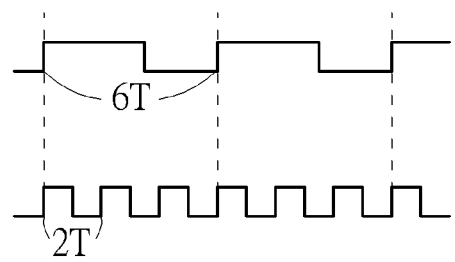
FIG. 2(a), FIG. 2(b) and FIG. 2(c) respectively are timing sequence comparison diagrams of an image detector and a reference light source according to the embodiment of the present invention.
Figure 2:
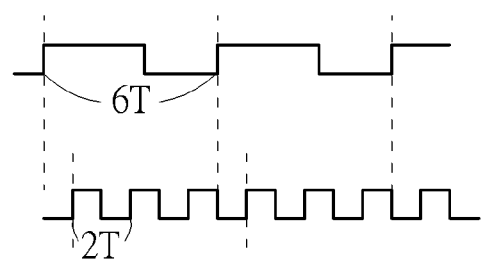
Figure 2:
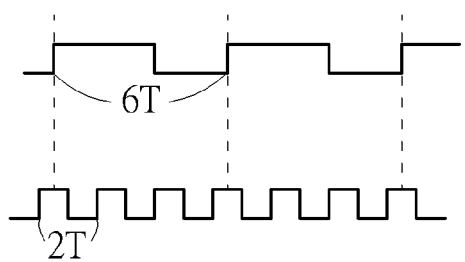

The reference value R is designed according to multiple difference between the exposure timing sequence of the image detector 16 and the light emitting timing sequence of the reference light source The reference value R is set and stored before the synchronization adjustment. Please refer to FIG. 2. FIG. 2(a), FIG. 2(b) and FIG. 2(c) respectively are timing sequence comparison diagrams of the image detector 16 and the reference light source 14 according to the embodiment of the present invention. The exposure timing sequence of the image detector 16 can be substantially integer times the light emitting frequency of the reference light source 14, preferably. For example, as shown in FIG. 2(a), the exposure timing sequence shows that the image detector 16 exposes once in 2 unit times, and the duty cycle of the image detector 16 is 50%; the light emitting frequency of the reference light source 14 is triple of the exposure frequency, and the duty cycle of the reference light source 14 preferably is greater than 50%.

The reference value R can include one first parameter R1 and a plurality of second parameters R2 for representing intensity standards of the captured images in different synchronous situations. For example, the first parameter R1 represents the intensity variation that the exposure timing sequence is synchronous with the light emitting timing sequence. Each exposure period of the image detector 16 can be completely located on enable area or unable area of the reference light source 14, which means the first parameter R1 includes arrangement of the fully illuminated image and the fully dark image. Further, the second parameter R2 represents the intensity variation that the exposure timing sequence is asynchronous with the light emitting timing sequence. At least one exposure period of the image detector 16 is located between the enable area and the unable area of the reference light source 14, which means the second parameter R2 includes arrangement of the fully illuminated image, the fully dark image and the non-fully illuminated image. The exposure timing sequence of the image detector 16 maybe different from (faster than or slower than) the light emitting timing sequence of the reference light source 14 when the optical detecting device 10 is initialized, the optical detecting device 10 can store the plurality of possible time difference (the first parameter R1 and the second parameters R2) inside the database 20 in advance for later verification.

As shown in FIG. 2(a), the exposure timing sequence of the image detector 16 is synchronous with the light emitting timing sequence of the reference light source 14, the image detector 16 can capture the reference light source 14 at former two exposures, and the first parameter R1 represents the arrangement of the fully illuminated image, the fully illuminated image and the fully dark image in sequence. As shown in FIG. 2(b), the exposure timing sequence of the image detector 16 is faster than the light emitting timing sequence of the reference light source 14. Second exposure of each continued image set captures parts of the reference light source 14, and third exposure of each continued image set does not capture the reference light source 14 by the image detector 16. One of the second parameters R2 represents the arrangement of the fully illuminated image, the half illuminated image and the fully dark image in sequence. As shown in FIG. 2(c), the exposure timing sequence of the image detector 16 is slower than the light emitting timing sequence of the reference light source 14. First exposure of each continued image set captures parts of the reference light source 14, and third exposure of each continued image set does not capture the reference light source 14 by the image detector 16. The other second parameter R2 represents the arrangement of the half illuminated image, the fully illuminated image and the fully dark image in sequence.

As shown in FIG. 1 and FIG. 2, the control unit 18 can analyze variation of a total intensity value or a mean intensity value of at least parts of pixels of each image (such as the above-mentioned three exposures) of the continued image set. The control unit 18 can set a partial area on the image, and amount (or average) the intensity of the whole pixels of the partial area to obtain a value. Then, the control unit 18 further can analyze the intensity arranged variation of images of the continued image set, which means interlaced arrangement of the fully illuminated image, the half illuminated image and the fully dark image, for comparison with the first parameter R1 and the second parameters R2 of the reference value R. The multiple differences between the exposure timing sequence of the image detector 16 and the light emitting timing sequence of the reference light source 14 can be set according to design demand, which is not limited to the above-mentioned value (triple frequency). The first parameter R1 and the second parameters R2 of the reference value R are varied according to the multiple differences in frequency between the image detector 16 and the reference light source 14, and a detailed description is omitted herein for simplicity.

Figure 3:
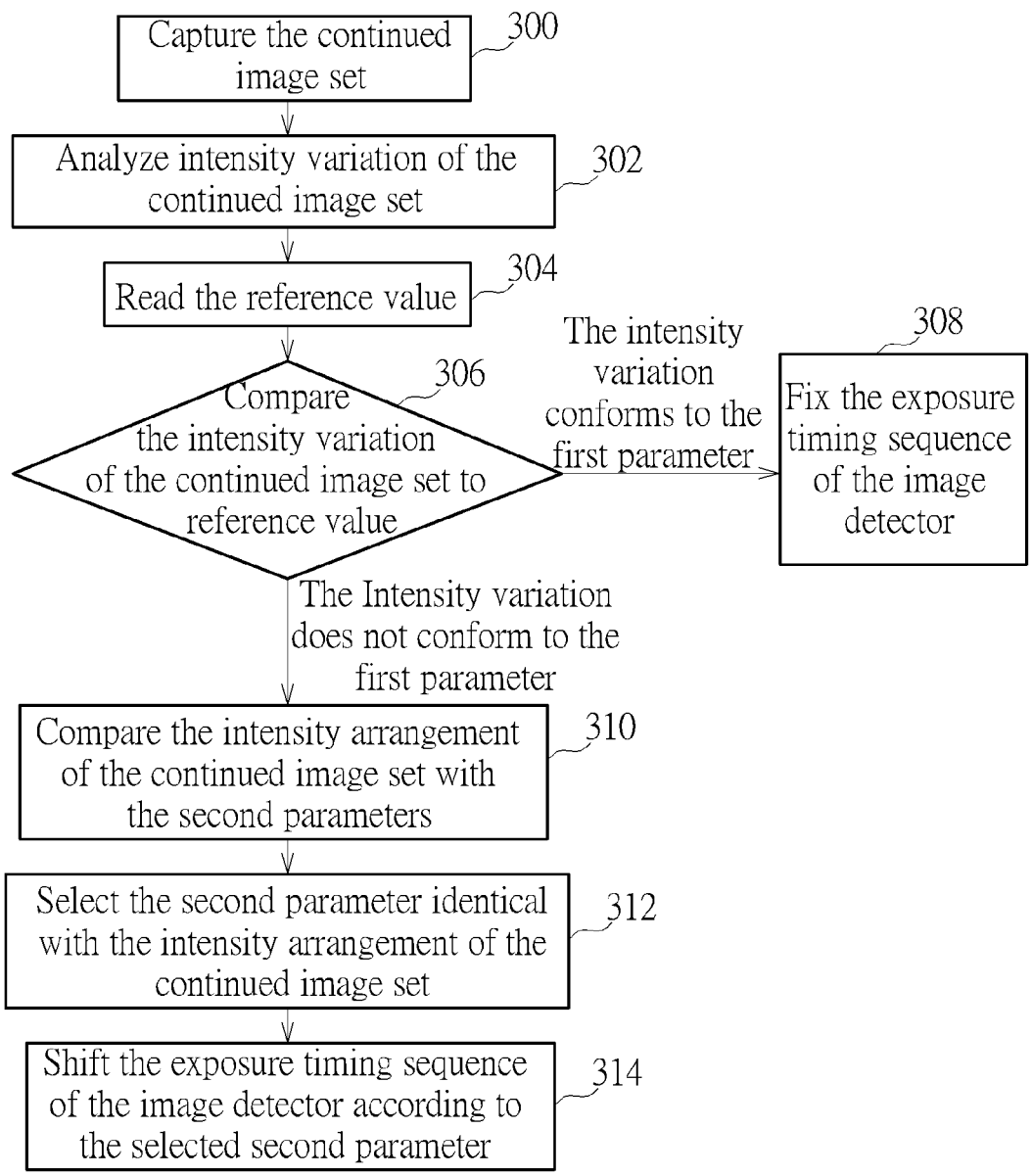
FIG. 3 is a flow chart of synchronizing an exposure timing sequence of the image detector with a light emitting timing sequence of the reference light source according to the embodiment of the present invention.

Please refer to FIG. 2 and FIG. 3. FIG. 3 is a flow chart of synchronizing the exposure timing sequence of the image detector 16 with the light emitting timing sequence of the reference light source 14 according to the embodiment of the present invention. The method of synchronization adjustment illustrated in FIG. 3 is suitable for the optical detecting device 10 shown in FIG. 1. First, step 300 is executed to capture the continued image set of the reference light source 14 by the image detector 16. Then, steps 302 and 304 are executed that the control unit 18 analyzes the intensity variation of the continued image set and connects to the database 20 to read the reference value R. Then, step 306 is executed and the control unit 18 compares the intensity variation of the continued image set to the first parameter R1. As the intensity variation conforms to the first parameter R1, the exposure timing sequence of the image detector 16 is synchronous with the light emitting timing sequence of the reference light source 14, as shown in FIG. 2(a), and step 308 is executed to fix the exposure timing sequence of the image detector 16. The first parameter R1 can be the maximum intensity value or well uniform intensity value of the continued image set, or the intensity arrangement set by the multiple differences in frequency between the image detector 16 and the reference light source 14.

As the intensity variation does not conform to the first parameter R1, step 310 is executed to compare the intensity arrangement of the continued image set with the second parameters R2. The reference value includes the plurality of second parameters R2, and each second parameter R2 has specific interlaced arrangement, so that the control unit 18 can find out the specific second parameter R2 to fit in with the intensity arrangement of the continued image set. Then, steps 312 and 314 are executed that the control unit 18 selects the second parameter R2 with the identical arrangement, and determines whether the exposure timing sequence of the image detector 16 is delayed or advanced according to the selected second parameter R2.

As shown in FIG. 2(b), when the intensity arrangement of the continued image set includes the fully illuminated image, the half illuminated image and the fully dark image in sequence, the control unit 18 can delay the exposure timing sequence of the image detector 16 until the image detector 16 captures two fully illuminated images, which means that the exposure timing sequence of the image detector 16 is synchronized with the light emitting timing sequence of the reference light source 14. As shown in FIG. 2(c), when the intensity arrangement of the continued image set includes the half illuminated image, the fully illuminated image and the fully dark image in sequence, the control unit 18 can advance the exposure timing sequence of the image detector 16; meanwhile, the image detector 16 can capture two fully illuminated images, and the exposure timing sequence of the image detector 16 is synchronized with the light emitting timing sequence of the reference light source 14.

The optical detecting device 10 of the present invention can adjust the exposure timing sequence of the image detector 16 according to the intensity value and the intensity arrangement of the continued image set captured by the image detector 16 when the light emitting timing sequence and the duty cycle of the reference light source 14 are known. Each timing sequence adjustment equals one-third time unit (T) or one-fourth time unit (T). Method illustrated in FIG. 3 is executed again to shift the exposure timing sequence of the image detector 16 step by step, so as to synchronize the exposure timing sequence with the light emitting timing sequence of the reference light source 14.

For the rapid synchronization adjustment, the present invention further utilizes the control unit 18 to increase the exposure timing sequence of the image detector 16. The image detector 16 can have a first operation mode and a second operation mode, the exposure frequency (frequency of the exposure timing sequence) of the first operation mode is greater than the exposure frequency of the second operation mode. As the optical detecting device 10 is initialized, the control unit 18 switches the image detector 16 into the first operation mode to speed the synchronization adjustment of the image detector 16 and the reference light source 14. When the exposure timing sequence of the image detector 16 is synchronous with the light emitting timing sequence of the reference light source 14, the control unit 18 switches the image detector 16 into the second operation mode, so as to achieve aims of the rapid synchronization adjustment and energy economy.

The optical detecting device 10 can be a portable orientation device, and the reference light source 14 can be reference point of the display. The present invention does not dispose the extra signal receiver on the display for synchronous feedback. The optical detecting device 10 of the present invention can adjust the exposure timing sequence of the image detector 16 according to flickering state of the reference light source 14 captured by the image detector 16 for the synchronization adjustment. Besides, the optical detecting device 10 further can be an optical sensor of the touch panel, the reference light source 14 further can be an active light source of the stylus, and the stylus does not have to include the extra signal receiver. The optical detecting device 10 switches the image detector 16 into the first operation mode for detection in a high-frequency scanning manner during the synchronization adjustment; in the meantime, the optical detecting device 10 inspects whether the image includes pixels with over-threshold intensity, and a median point of the pixels with the over-threshold intensity is not calculated (which means position of the stylus is not computed). After the synchronization adjustment is finished, the optical detecting device 10 switches the image detector 16 into the second operation mode for calculation of the median point.

Comparing to the prior art, the present invention does not dispose the extra signal receiver on the reference light source. The control unit of the optical detecting device can directly adjust the exposure timing sequence of the image detector according to the flickering state of the reference light source, so as to synchronize the timing sequence of the image detector and the reference light source, for decreasing element amounts and manufacturing cost and enhancing market competition of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of an optical detecting device for synchronizing an exposure timing sequence of an image detector with a light emitting timing sequence of a reference light source, the method comprising:
    capturing a continued image set according to a predetermined period;
    analyzing intensity variation of the continued image set; and
    adjusting the exposure timing sequence of the image detector according to the intensity variation so as to synchronize the exposure timing sequence of the image detector with the light emitting timing sequence of the reference light source.

2. The method of claim 1, further comprising:
    setting partial area on pixel array of the image detector; and
    amounting intensity of the whole pixels of the partial area.

3. The method of claim 2, wherein the intensity variation comprises a total intensity value or a mean intensity value of at least parts of the pixels of each image of the continued image set, and/or intensity arranged variation of the images of the continued image set.

4. The method of claim 1, wherein adjusting the exposure timing sequence of the image detector according to the intensity variation comprises:
connecting to a database to read a reference value;
comparing the reference value to the intensity variation; and
shifting the exposure timing sequence of the image detector according to a comparison.

5. The method of claim 4, wherein the reference value at least comprises a first parameter, the first parameter has arrangement of a fully illuminated image and a fully dark image.

6. The method of claim 5, wherein the reference value further comprises a second parameter, the second parameter has arrangement of a fully illuminated image, a fully dark image and a non-fully illuminated image.

7. The method of claim 5, further comprising:
fixing the exposure timing sequence of the image detector when the intensity of the continued image set conforms to the first parameter.

8. The method of claim 5, further comprising:
fixing the exposure timing sequence of the image detector when the intensity arrangement of the continued image set conforms to the first parameter.

9. The method of claim 6, further comprising:
analyzing the intensity arrangement of the continued image set to compare with the second parameter when the intensity arrangement of the continued image set does not conform to the first parameter; and
shifting the exposure timing sequence of the image detector according to analysis.

10. The method of claim 9, wherein the reference value comprises a plurality of second parameters, the method further comprises:
selecting the second parameter identical to the intensity arrangement of the continued image set from the plurality of second parameters; and
determining whether the exposure timing sequence of the image detector is delayed or advanced according to the selected second parameter.

11. The method of claim 1, further comprising:
designing the reference value according to multiple difference between the exposure timing sequence of the image detector and the light emitting timing sequence of the reference light source; and
storing the reference value into the database before synchronization adjustment.

12. The method of claim 11, wherein the exposure timing sequence of the image detector is substantially integer times the light emitting timing sequence of the reference light source.

13. The method of claim 1, wherein a duty cycle of the light emitting timing sequence is substantially greater than 50%.

14. The method of claim 1, further comprising:
increasing the exposure timing sequence of the image detector to capture the plurality of images.

15. An optical detecting device for reading a reference light source to filter noise, the optical detecting device comprising:
an image detector for capturing a continued image set according to a predetermined period; and
a control unit electrically connected to the image detector, the control unit analyzing intensity variation of the continued image set, and adjusting an exposure timing sequence of the image detector according to the intensity variation so as to synchronize the exposure timing sequence of the image detector with a light emitting timing sequence of the reference light source.

16. The optical detecting device of claim 15, wherein the control unit sets partial area on pixel array of the image detector, and amounts intensity of the whole pixels of the partial area.

17. The optical detecting device of claim 16, wherein the control unit analyzes the intensity variation of a total intensity value or a mean intensity value of at least parts of the pixels of each image of the continued image set, and/or intensity arranged variation of the images of the continued image set.

18. The optical detecting device of claim 15, further comprising:
a database for storing the reference value.

19. The optical detecting device of claim 18, wherein the control unit connects to the database to read the reference value, and compares the reference value to the intensity variation, so as to shift the exposure timing sequence of the image detector according to a comparison.

20. The optical detecting device of claim 18, wherein the reference value at least comprises a first parameter, the first parameter has arrangement of a fully illuminated image and a fully dark image.

21. The optical detecting device of claim 20, wherein the reference value further comprises a second parameter, the second parameter has arrangement of a fully illuminated image, a fully dark image and a non-fully illuminated image.

22. The optical detecting device of claim 20, wherein the control unit fixes the exposure timing sequence of the image detector when the intensity of the continued image set conforms to the first parameter.

23. The optical detecting device of claim 20, wherein the control unit fixes the exposure timing sequence of the image detector when the intensity arrangement of the continued image set conforms to the first parameter.

24. The optical detecting device of claim 21, wherein the control unit analyzes the intensity arrangement of the continued image set to compare with the second parameter when the intensity arrangement of the continued image set does not conform to the first parameter, and shifts the exposure timing sequence of the image detector according to analysis.

25. The optical detecting device of claim 24, wherein the reference value comprises a plurality of second parameters, the control unit selects the second parameter identical to the intensity arrangement of the continued image set from the plurality of second parameters, and determines whether the exposure timing sequence of the image detector is delayed or advanced according to the selected second parameter.

26. The optical detecting device of claim 15, wherein the reference value is designed according to multiple difference between the exposure timing sequence of the image detector and the light emitting timing sequence of the reference light source, and is stored into the database before synchronization adjustment.

27. The optical detecting device of claim 26, wherein the exposure timing sequence of the image detector is substantially integer times the light emitting timing sequence of the reference light source.

28. The optical detecting device of claim 15, wherein a duty cycle of the light emitting timing sequence is substantially greater than 50%.

29. The optical detecting device of claim 15, wherein the control unit drives the image detector to increase the exposure timing sequence for capturing the plurality of images.

30. An optical detecting device for reading a reference light source to filter noise, the optical detecting device comprising:

an image detector having a first operation mode and a second operation mode, an exposure timing sequence of the first operation mode being greater than an exposure timing sequence of the second operation mode; and a control unit electrically connected to the image detector, the control unit switching the image detector into the first operation mode to capture a continued image set according to a predetermine period, analyzing intensity variation of the continued image set, and adjusting the exposure timing sequence of the image detector according to the intensity variation so as to synchronize the exposure timing sequence of the image detector with a light emitting timing sequence of the reference light source;

wherein the control unit switches the image detector into the second operation mode when the exposure timing sequence of the image detector and the light emitting timing sequence of the reference light source are in synchronization.

* * * * *